US012529978B2

(12) United States Patent
Kim et al.

(10) Patent No.: US 12,529,978 B2
(45) Date of Patent: Jan. 20, 2026

(54) DEVELOPING AND FUR-BRUSH TYPE ROLLERS OF CARTRIDGE

(71) Applicant: Hewlett-Packard Development Company, L.P., Spring, TX (US)

(72) Inventors: Taehyun Kim, Seongnam Si (KR); Yunhyung Bae, Seongnam Si (KR); Ara Kim, Seongnam Si (KR); Youngphil Ji, Seongnam Si (KR); Yongsang Ryu, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/703,614

(22) PCT Filed: Oct. 27, 2021

(86) PCT No.: PCT/US2021/056826

§ 371 (c)(1),
(2) Date: Apr. 22, 2024

(87) PCT Pub. No.: WO2023/075763

PCT Pub. Date: May 4, 2023

(65) Prior Publication Data

US 2025/0237971 A1 Jul. 24, 2025

(51) Int. Cl.
*G03G 15/08* (2006.01)

(52) U.S. Cl.
CPC ..... *G03G 15/0808* (2013.01); *G03G 15/0818* (2013.01); *G03G 2215/0614* (2013.01)

(58) Field of Classification Search
None
See application file for complete search history.

(56) References Cited

U.S. PATENT DOCUMENTS

| | | | | |
|---|---|---|---|---|
| 5,073,797 A * | 12/1991 | Ono | G03G 15/0818 399/105 |
| 5,170,213 A * | 12/1992 | Yamaguchi | G03G 15/0818 399/284 |
| 7,139,513 B2 | 11/2006 | Okamoto et al. | |
| 7,209,699 B2 | 4/2007 | Yamaguchi et al. | |
| 7,373,099 B2 | 5/2008 | Kweon | |
| 7,676,183 B2 | 3/2010 | Kimura et al. | |
| 8,606,145 B2 | 12/2013 | Igarashi et al. | |
| 10,942,470 B2 | 3/2021 | Fujino et al. | |
| 2010/0074656 A1* | 3/2010 | Denton | G03G 15/0808 399/281 |
| 2010/0150619 A1* | 6/2010 | Maeda | G03G 15/0818 399/287 |
| 2011/0135344 A1* | 6/2011 | Ebe | G03G 15/0812 399/284 |

FOREIGN PATENT DOCUMENTS

| | | |
|---|---|---|
| JP | 2007-171594 A | 7/2007 |
| JP | 2009-116069 A | 5/2009 |
| JP | 4376616 B2 | 12/2009 |

* cited by examiner

*Primary Examiner* — Sevan A Aydin
(74) *Attorney, Agent, or Firm* — Brooks, Cameron & Huebsch, PLLC

(57) ABSTRACT

A cartridge to contain a developer includes a developing roller to carry the developer and a fur-brush type supplying roller to form a nip region with the developing roller to supply the developer to the developing roller. A surface layer of the developing roller includes a groove formed on the surface layer to come into contact with the fur-brush type supplying roller.

14 Claims, 10 Drawing Sheets

Poor Toner Supply

FBSR Compression Set

DEVELOPING AND FUR-BRUSH TYPE ROLLERS OF CARTRIDGE

BACKGROUND

An image forming apparatus forms an image on a recording medium, for example, in an electrophotographic manner. An image forming apparatus using the electrophotographic method supplies toner to an electrostatic latent image formed on a photoconductor to form a visible toner image on the photoconductor, transfers the toner image to the recording medium via an intermediate transfer medium or directly to a recording medium, and then fixes the transferred toner image on the recording medium.

A development system of an image forming apparatus may include a cartridge capable of being detachably coupled to the image forming apparatus. The cartridge may include an assembly of members including a photoconductor, a developing roller (DR), and a supplying roller (SR) for forming the visible toner image on the photoconductor. The cartridge may be detachably coupled to a main body of the image forming apparatus and be a consumable item that is replaced when service life of the cartridge is over.

DETAILED DESCRIPTION

Figure 1:
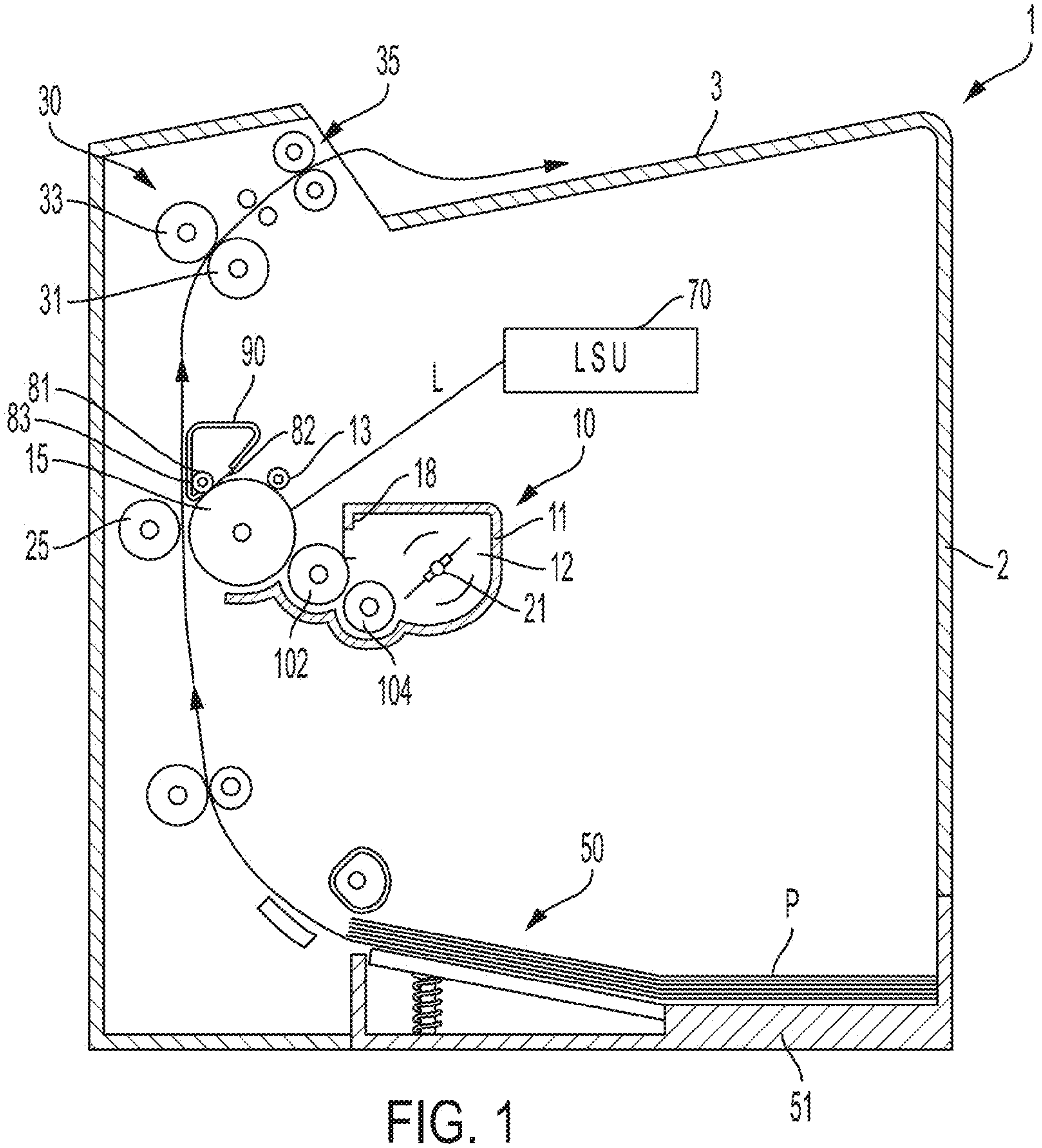
FIG. 1 is a schematic diagram illustrating a structure of an image forming apparatus according to an example.

Hereinafter, an example of an image forming apparatus and a developing system, such as a system involving a cartridge to develop an image will be described in detail with reference to the accompanying drawings. Elements having substantially the same configurations are denoted by the same reference numerals in the specification and the accompanying drawings, and thus, a repeated description thereof is omitted.

Figure 2:
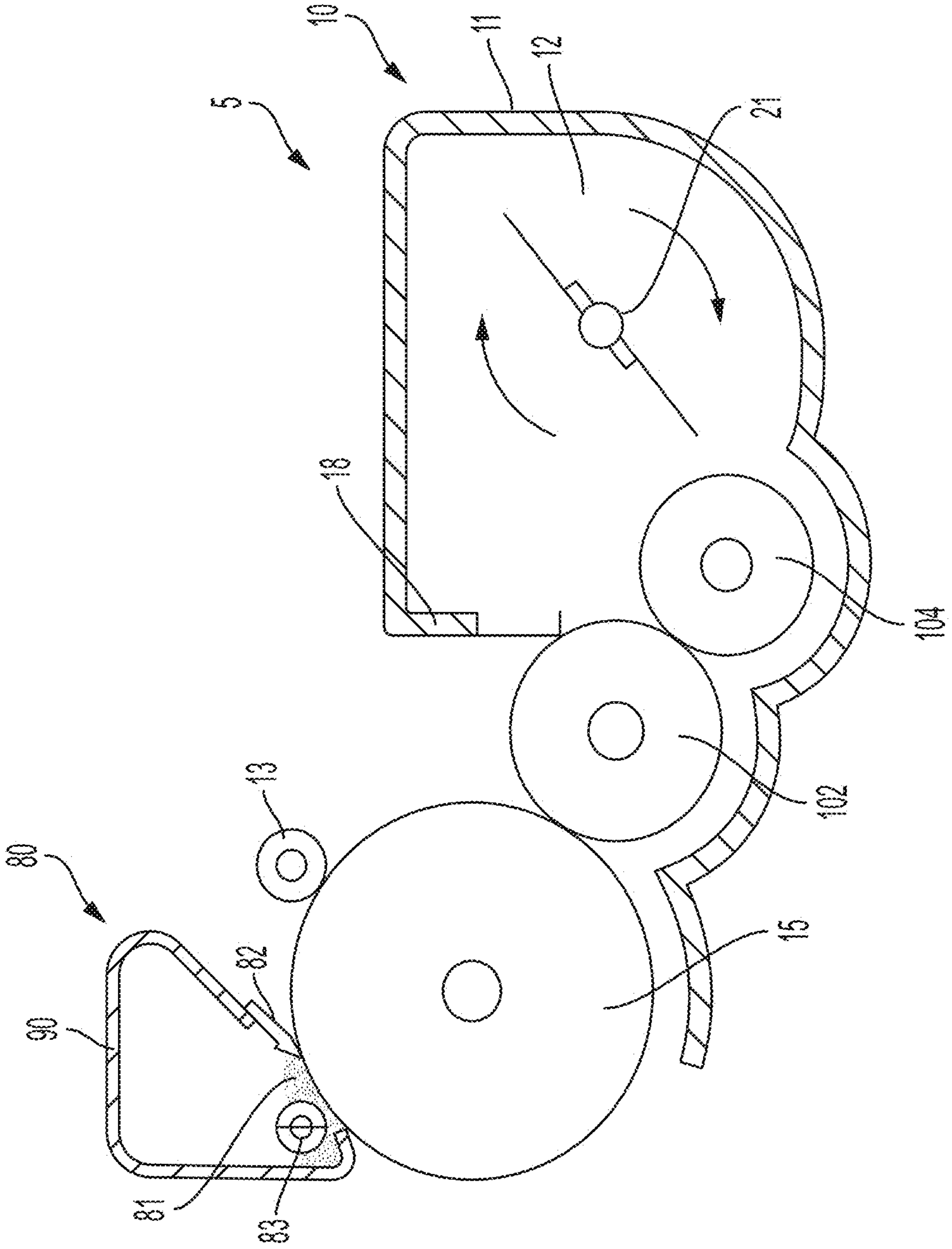
FIG. 2 is an enlarged sectional view diagram of a developing cartridge shown in FIG. 1 according to an example.

Referring to FIGS. 1 and 2, an electrophotographic image forming apparatus 1 is an image forming apparatus such as an electrophotographic image forming apparatus in which an electrostatic latent image formed on an external surface of a photosensitive drum 15 is developed into a visible image by supplying a developing agent, for example, toner, to the electrostatic latent image. The visible image is then transferred to a recording medium, for example, printing paper P and is then fused to obtain a desired printed image. In the image forming apparatus 1, the printing paper P is moved from a lower portion to an upper portion thereof along a C-shaped path indicated in FIG. 1 by directional arrows. The image forming apparatus 1 includes developing system in form of a developing cartridge 10, a transferring roller 25, a fixing unit 30, a laser scanning unit (LSU) 70, and a pick-up unit 50 including a pickup roller 55, which picks up the printing paper P from a paper feeding cassette 51 receiving sheets of paper P.

The LSU 70 scans light (L) that corresponds to image information to be printed onto the photosensitive drum 15 according to a computer signal to form the electrostatic latent image on the external surface of the photosensitive drum 15.

The developing cartridge 10 is detachably coupled in a frame 2 of the image forming apparatus 1. The developing cartridge 10 may include a developing housing 11. According to an example, the developing housing 11 may include a developing roller (DR) 102, and a supplying roller in form of fur-brush supplying roller (FBSR) 104. The developing cartridge 10 may also include an agitator 21, and a toner layer regulating unit 18. In addition, a developer storing portion 12 to store a developer as printing material, for example, a toner is provided in the developing housing 11 of the developing cartridge 10. For example, the developing cartridge 10 may be replaced when the toner contained in the toner storing portion 12 is fully consumed.

The toner contained in the toner storing portion 12 may be transferred on an external surface of the developing roller 102, which supplies the toner to the photosensitive body 15. The developing roller 102, which may be coated with toner, and which may be in a solid powder form, develops the electrostatic latent image into a toner image by supplying the toner to the electrostatic latent image formed on the photosensitive drum 15. A developing bias voltage may be applied to the developing roller 102 to supply the toner to the photosensitive drum 15. The supplying roller 19 may supply the toner in the toner storing portion 12 to the developing roller 102 while rotating in a determined direction. The agitator 21 may agitate the toner in the toner storing portion 12 at a determined speed to prevent caking of the toner and moves the toner in the toner storing portion 12 closer to the supplying roller 19. One end of the toner layer regulating unit 18 may be fixed to the developing unit housing 11. The other end of the toner layer regulating unit 18 may contact the developing roller 102, to regulate a height of toner adhering to the external surface of the developing roller 102, and to charge the toner to a predetermined polarity by creating friction.

The photosensitive drum 15 rotates in a predetermined direction and is installed such that a portion of the external surface thereof is exposed. The photosensitive drum 15 is charged to a predetermined potential by a charging roller 13, which is described below. As described above, the electrostatic latent image that corresponds to an image to be printed may be formed on the external surface of the photosensitive drum 15 according to the light emitted by the LSU 70. An exposed portion of the external surface of the photosensitive drum 15 faces the transferring roller 25.

A charge bias voltage may be applied to the charging roller 13. The charging roller 13 then may charge the photosensitive drum 15 to a determined potential.

Referring to FIG. 1, the transferring roller 25 may be installed to face a circumference of the photosensitive drum 15 and applies a transfer bias voltage having a polarity opposite to the toner image developed on the photosensitive drum 15 such that the toner image can be transferred to the paper P. The toner image is transferred to the paper P by the electrostatic force exerted between the photosensitive drum 15 and the transferring roller 25.

According to an example, a waste toner reservoir unit 80 may be installed above and displaced from a center of the photosensitive drum 15 and includes a housing 90, a cleaning blade 82, and an auger 83.

According to an example, the housing 90 may be machined into a bent shape and forms a body of the waste toner reservoir unit 80 shown in FIG. 2. The cleaning blade 82 may be installed such that one edge thereof is attached to the housing 90 and the other edge thereof is installed along a lengthwise direction of the photosensitive drum 15 to contact and push a portion of the photosensitive drum 15 with a determined force such that waste toner 81 remaining on the photosensitive drum 15 can be removed therefrom. The auger 83 may be installed in the waste toner reservoir unit 80 to rotate in a predetermined direction to convey the waste toner 81 that is removed from the photosensitive drum 15 into a storing portion located at one end of the waste toner reservoir unit 80 and receives the waste toner 81 that is conveyed by the auger 83.

The fixing unit 30 may include a heating roller 31 and a pressing roller 33 installed to face the heating roller 31. The fixing unit 30 fixes the toner image to the paper P by applying heat and pressure to the toner image. The heating roller 31, which may be a heat source for fixing the toner image, may be installed to face the pressing roller 33 along the axial direction. The pressing roller 33, which is installed to face the heating roller 31, fixes the toner image to the paper P by applying a high pressure to the paper P. A paper discharging roller 35 discharges the paper P to which the toner image has been fixed out of the image forming apparatus 1. The paper P that is discharged out of the image forming apparatus 1 is laid on a printed paper cassette 3.

Figure 3:
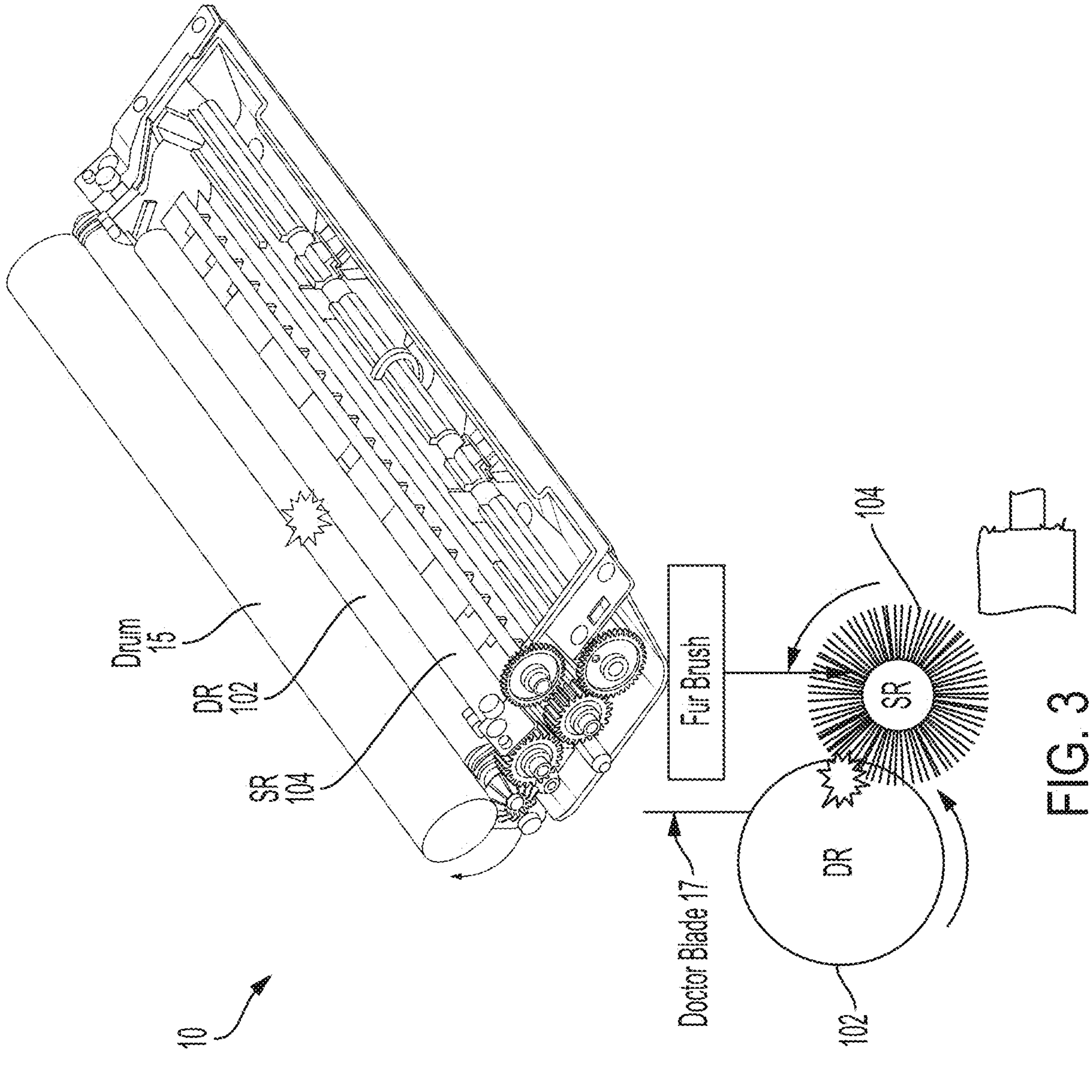
FIG. 3 is a perspective view illustrating a developing cartridge according to an example.

FIG. 3 is a perspective view illustrating a developing cartridge according to an example. According to an example, a developing cartridge 10 is to contain a developer and may include a developing roller 102 carrying the developer, and a fur-brush type supplying roller 104 to form a nip with the developing roller to supply the developer to the developing roller.

As an example, the developing cartridge 10 is a non-magnetic one-component developing system to develop the electrophotographic image in the electrophotographic image forming apparatus 1. The electrophotographic image forming apparatus forms an electrostatic latent image on a photosensitive layer formed on an external surface of the photosensitive drum 15 as a photoconductor, for example, an organic photo conductor (OPC). The photosensitive layer may be charged to form a visible toner image when a developer as printing material, for example, a toner is applied by a developing cartridge 10 to the electrostatic latent image on the photosensitive layer. The photosensitive drum 15 transfers and fixes the visible toner image to a recording medium, for example, paper, thereby printing the image.

Referring to FIG. 3, the non-magnetic one-component developing system may be in form of the developing cartridge 10 that includes the photoconductor drum 15, the developing roller 102 and the fur-brush type supplying roller 104 to supply a developer, for example, toner, contained in the cartridge 10, to the developing roller 102 to cause the developing roller 102 develop the electrostatic latent image in cooperation with the photoconductor drum 15.

According to an example, a life span of the developing system such as a cartridge may be extended by minimizing wear, tear, or stress on the developing system, which may include toner stress. Toner stress may vary depending on a developing system. In the case of non-magnetic one-component contact development type system, toner stress may occur at a contact area between the photosensitive drum 15 and the developing roller 102; developing roller 102 and a Doctor Blade 17; and between the developing roller 102 and the fur-brush type supplying roller 104. In the case of magnetic one-component non-contact development type system, toner stress may occur at the contact area between developing roller 102 and the Doctor Blade 17, or between the developing roller 102 and the fur-brush type supplying roller 104, because there may be a constant gap between the photosensitive drum 15 and the developing roller 102. As an example, toner stress occurring at the contact area between the developing roller 102 and the fur-brush type supplying roller 104 may be reduced by using the fur-brush type supplying roller 104, which does not cause image defects and extend the life span of developing cartridge 10.

As an example, the fur-type brush supplying roller 104 may minimize toner stress between the developing roller 102 and the fur-brush type supplying roller 104, while controlling a thickness of toner layer formed above the developing roller 104 by improving the ability of resetting residual toner relative to the ability of other types of supply rollers, such as silicone or poly-urethane, thereby resulting in reduction in image-contamination, ghosting, and longitudinal rise of toner density.

According to an example, with reference to FIGS. 4-7, control of conditions including a groove depth 120 of a groove 110 formed on a surface layer 116 of the developing roller 102; a nip depth 152 between the developing roller 102 and the fur-brush type supplying roller 104; and a density of fur-brush 180 of the fur-brush type supplying roller 104 are illustrated.

As an example, the cartridge 10 to contain a developer includes the developing roller 102 to carry the developer, and a fur-brush type supplying roller 104 to form a nip with the developing roller 102 to supply the developer to the developing roller 102. As an example, a surface layer 116 of the developing roller 102 may include a groove 110 formed on the surface layer 116 to come into contact with the fur-brush type supplying roller 104.

As an example, a depth of the groove 110 may be in a range of about 0.5 μm to about 10 μm. As an example, the depth of the groove may be less than about 5 μm. As an example, a depth 152 of a nip region of the nip formed between the developing roller 102 and the fur-brush type supplying roller 104 is in a range of about 100 μm to about 350 μm. As an example, a density of fur brushes of the fur-brush type supplying roller may be about 83% or higher.

In some examples, the groove depth 120 of a surface layer 116 of the developing roller 104 may be in a range of about 0.5 μm to about 10 μm; the nip depth 152 between the developing roller 102 and the fur-brush type supplying roller 104 may be in a range of about 100 μm to about 350 μm; a relation between the groove depth 120 and the nip depth 152 may be represented by groove depth 120/nip depth 152=about 0.5% to about 3.0%; and the density of the fur-brush 180 of the fur-brush type supplying roller 104 may be about 83% or higher when, for example, an average density of the fur-brush 180 based on at least 5 measurement points obtained from a measurement equipment is analyzed.

Figure 4:
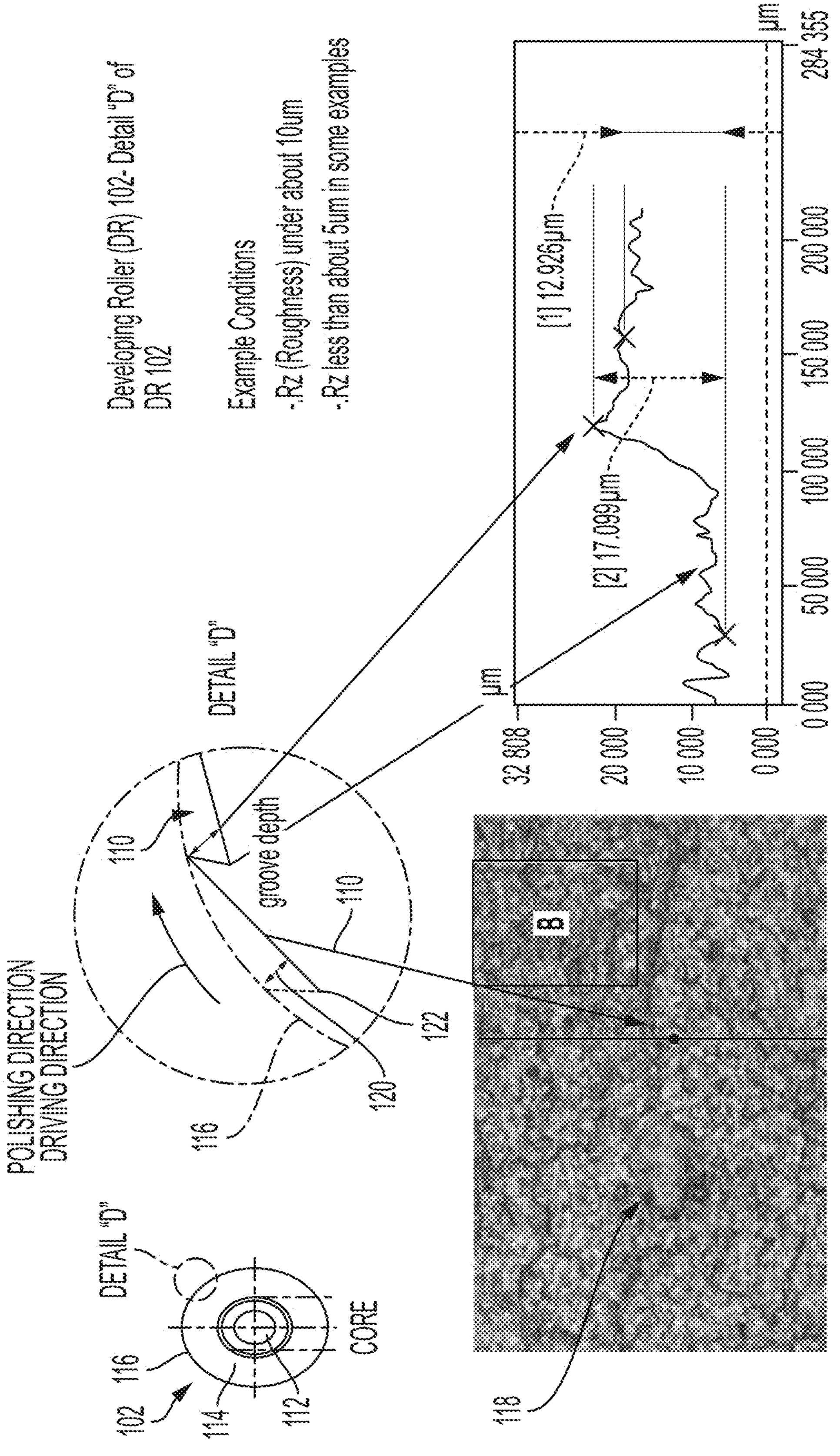
FIG. 4 is a diagram illustrating a shape and a dimension of a groove on a surface of a developing roller according to an example.

FIG. 4 is a diagram illustrating a shape and a dimension of a groove on a surface layer of a developing roller according to an example. As an example, the developing roller 102 may include a shaft 112, an electroconductive elastic layer 114 provided on an outer circumference of the shaft 112, and a surface layer 116 that covers the electroconductive elastic layer 114. According to an example, referring to Image A, B and D of FIG. 5A, the surface layer 116 may include a plurality of protruding beads 118 formed resulting from a manufacturing process. The electroconductive elastic layer 114 may include an elastomer matrix; and electroconductive particles dispersed in the elastomer matrix. For example, the elastomer matrix may include at least a type of rubber selected from various types of rubber such as natural rubber, polyurethane, butyl rubber, nitrile rubber, polyisoprene rubber, polybutadiene rubber, silicone rubber, styrene-butadiene rubber, ethylene-propylene rubber, ethylene-propylene-diene rubber, chloroprene rubber, acrylic rubber, a mixture thereof, or a foam thereof. In particular, the elastomer matrix may be silicone rubber, ethylene-propylene-diene rubber, polyurethane, a mixture thereof, or a foam thereof, and these may be used alone or as a mixture.

The shaft 112 may be electrically conductive. For example, the shaft 112 may have a shape of a cylinder. For example, the shaft 112 may be formed of a metal such as aluminum, iron, or stainless steel, or a combination thereof. For example, an external (from outside of a core) diameter of the shaft 112 may be in a range of about 6 mm to about 20 mm. Using at least one type of rubber, a developing roller 102 is manufactured through extrusion molding, vulcanization, and grinding. The developing roller 102 may be treated by UV after the grinding process.

As an example, the surface layer 116 of the electroconductive elastic layer 114 of the developing roller 102 may include a cavity. As an example, the cavity may be in form of a groove 110 formed in an axial direction on the surface layer 116 that is to come into contact with the fur-brush type supplying roller 104. The groove 110 may be a cavity in form of a cell, which is a space bounded by a pair of sides having a shorter side and a longer side that form an acute angle (angle measurable less than 90 degrees) 122, for example, as illustrated in detail 'D' in FIG. 4. As an example, a groove depth 120 of the groove 110 measured from an end of the shorter side to the longer side at an approximately right angle may be in a range of about 0.5 micrometer (μm) to about 10 μm. In some examples, the groove depth 120 may be less than about 5 μm.

Figure 5A:
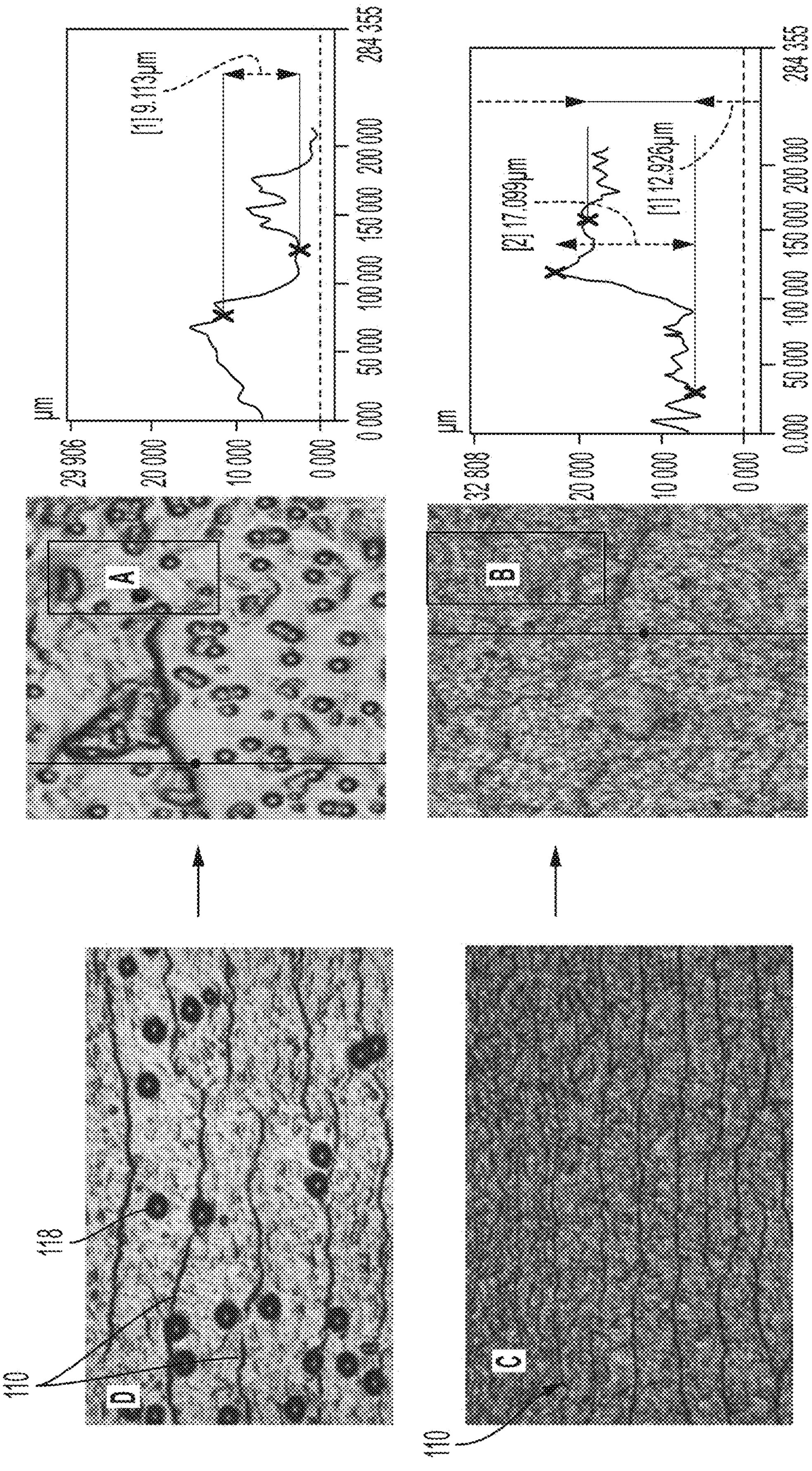
FIG. 5A illustrates images of morphology of a surface layer of the developing roller and corresponding measurement information obtained from a measurement equipment, according to an example.

FIG. 5A are images of morphology of a surface layer of the developing roller and corresponding measurement information obtained from a measurement equipment, according to an example. As an example, the groove depth 120 may be measured using a measurement equipment or device, for example, a KEYENCE laser microscope.

As an example, a pattern of the groove 110 may be formed by roll-rubbing the developing roller 102 against an abrasive surface, such as grinding stone, to cause a roughness depth (Rz) as the groove depth 120. According to an example, the caused roughness may be by a surface pattern or a surface shape, such as a surface pattern that may be referred to as a grinded groove 110. As an example, a morphology of the grinded groove 110 may be a plurality of substantially linear or wavy grinded grooves 110 that may be substantially parallel to the axis of the developing roller 102. In other words, the grinded grooves 110 may be a set of rows substantially perpendicular to a rolling direction of the developing roller 102. However, other morphologies of grooves 110 may be provided.

In the following comparative examples, the grinded groove depth 120 of the developing roller 102 may be measured by the KEYENCE laser microscope in which the objective lens condition may be selectively set to magnify 400 diameter, 1000 diameter, to observe the grinded groove depth 120.

Grinded groove depth of DR 120=Highest point (part without beads 118) from measurement information profile, for example, indicated as 'X' on the graphs corresponding to images A and B−(minus) Lowest point on the profile (as illustrated in the graphs obtained from the measurement equipment corresponding to images A and B in FIGS. 4 and 5.

Example image A: grinded groove depth 120, 9 μm=>pass

Example image B: grinded groove depth 120, 17 μm=>fail

Example image C: grinded groove morphology (single layer DR, electroconductive elastic layer)

Example image D: grinded groove morphology (double layer DR, coating layer which may include a plurality of protruding beads 118)

Figure 5B:
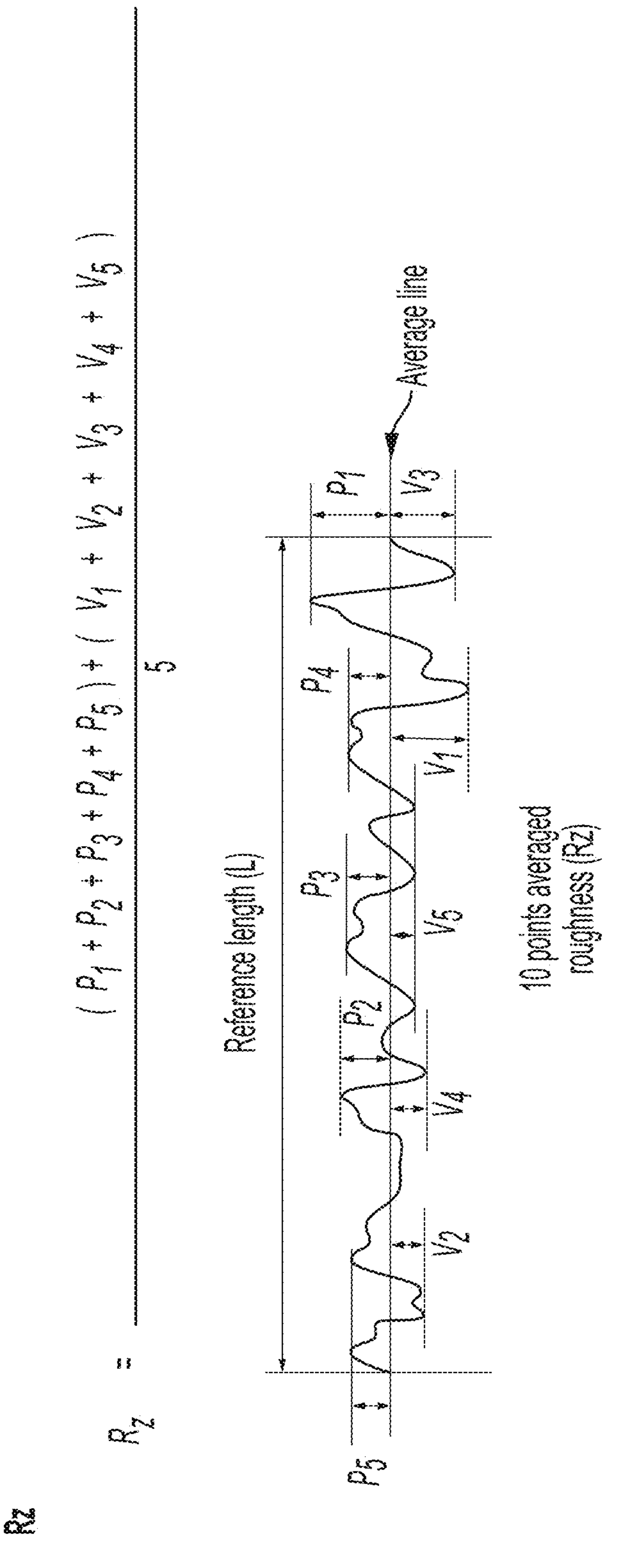
FIG. 5B illustrates measurement information corresponding to morphology of a surface layer of the developing roller as obtained from a measurement equipment, according to another example.

FIG. 5B illustrates measurement information corresponding to morphology of a surface layer of the developing roller as obtained from a measurement equipment, according to another example. A surface roughness of the developing roller 102 may be expressed as Rz to indicate the surface roughness. The groove depth 120 on the surface layer 116 of the developing roller 102 may be considered as roughness that may be measured in micrometer units by a measurement equipment. As an example, in FIG. 5B, a graph of 10 points of high values P1-P5 and low values V1-V5 representing measured groove depths 120 over a reference length L are averaged to obtain a roughness value (Rz). As an example, an Rz may be in a range of about 0.5 micrometer (μm) to about 10 μm. In some examples, the Rz may be less than about 5 μm.

Figure 6:
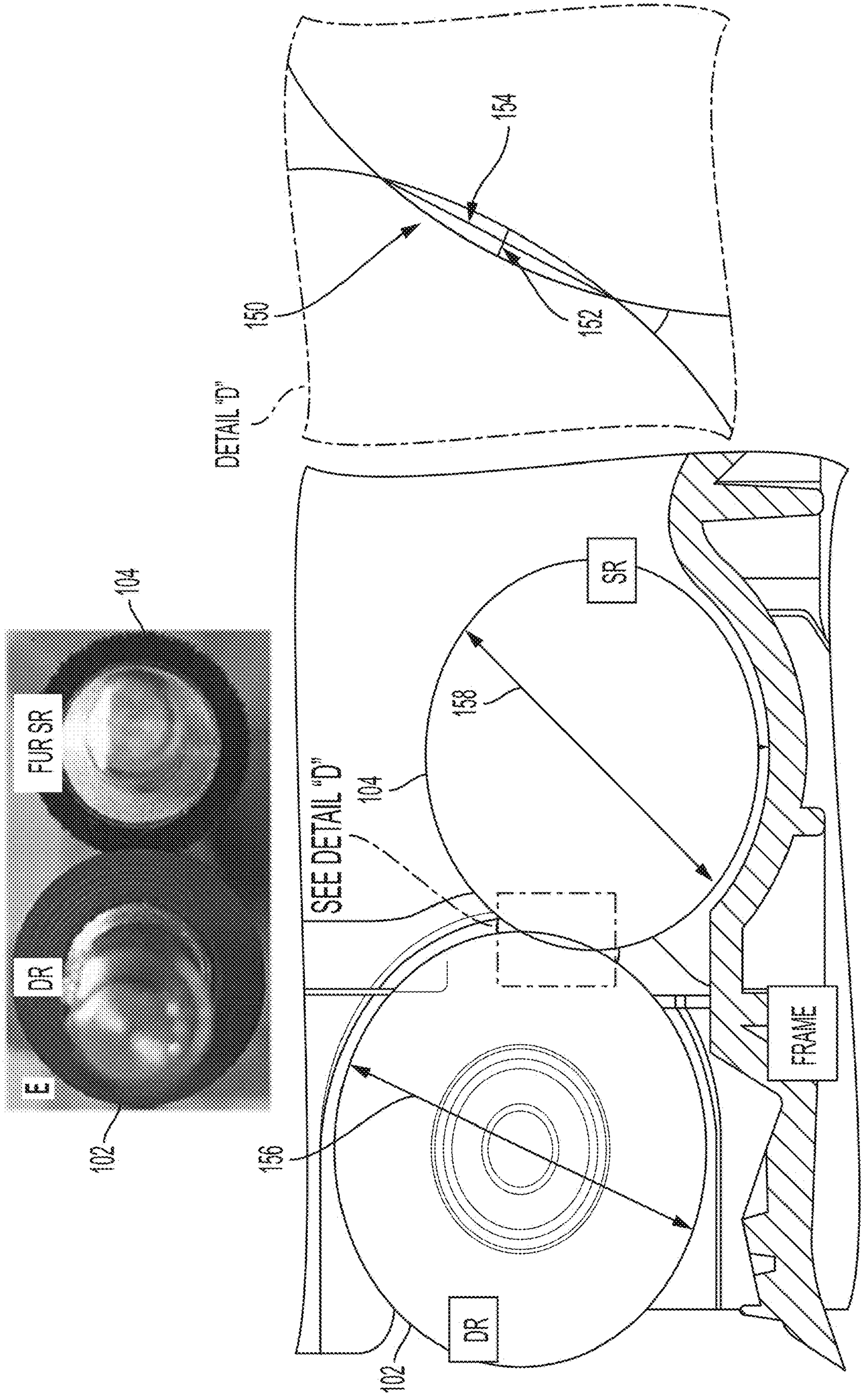
FIG. 6 is a sectional view diagram illustrating a nip formed between a developing roller and a fur-brush type supplying roller, according to an example.

FIG. 6 is a sectional view diagram illustrating a nip formed between a developing roller and a fur-brush type supplying roller, according to an example. According to an example, an overlapping nip depth as a nip depth 152, among nip depths, may be set. The nip depth 152 may be measured as a width of a supplying nip 150 formed between the developing roller 102 and the fur-brush type supplying roller 104 when the developing roller 102 and the fur-brush type supplying roller 104 are urged towards each other by a pressing force, for example, by applying a driving force during operation of the developing cartridge, or a preset applied load based on an instrument design to set a structural design to have a distance between axes of the developing roller 102 and that fur-brush type roller 104 that may be less than a radius of the developing roller 102 plus a radius of the fur-brush supplying roller 104 to form an overlap. Hardness of the developing roller 102 may be higher than a hardness of the fur-brush type roller 104, so that a supplying nip 150 may be formed by the fur-brush type roller 104 towards a direction of the developing roller 102. According to an example, referring to Image E of FIG. 6, the supplying nip 150 may be set by structural design during manufacture of the developing cartridge 10, to cause the developing roller 102 and the fur-brush type supplying roller 104 come into contact with each other to a developing position to form the supplying nip 150 having an overlapping width (also referred to as nip depth) and an overlapping length (as referred to as nip length). As an example, in FIG. 6, the developing roller 102 and the fur-brush type supplying roller 104 may be disposed on a frame of the cartridge 10.

Overlapping refers to a reference zone in which there may be contact between the developing roller 102 and the fur-brush type supplying roller 104 to form the supplying nip region 150. The supplying nip region 150 may be a deformed contacting region formed longitudinally as in a lengthwise axial direction between an outermost layer surface of the developing roller 102 and fur-brushes of the fur-brush type roller 104 by a deformation of the developing roller 102 and the fur-brush type supplying roller 104 when urged towards each other. The supplying nip region 150 which is a contacting zone between the developing roller 102 and the fur-brush type supplying roller 104 may have a nip depth, among nip depths, measurable as a width 152 between the developing roller 102 and the fur-brush type supplying roller 104, along a length of the nip region 150 formed longitudinally between the developing roller 102 and the fur-brush type supplying roller 104. The supplying nip region 150 may have a nip length 154. A nip depth 152, among nip depths, may be in a range of about 100 um to 350 um.

As an example, a deformation between the developing roller 102 and the fur-brush type supplying roller 104 may specify a structure of the supplying nip region 150 having a nip depth 152 and a nip length 154, which may represent an 'overlapping' by deformation as the supplying nip region 150 in FIG. 6 and by which to express "a nip depth" 152. The nip depth 152 may indicate a degree of deformed contact between the developing roller 102 and the fur-brush type supplying roller 104 when being urged towards each other.

As an example, the nip depth 152 may be defined according to the following relations: (half of outer diameter 156 (radius) of developing roller 102+half outer diameter 158 (radius) of the fur-brush type supplying roller 104)−(minus) a distance between respective axles of the developing roller 102 and fur-brush type supplying roller 104 before formation of the supplying nip region 150, and to instrumentally design a nip depth 152 to have a distance between axes of the developing roller 102 and that fur-brush type roller 104 that may be less than the radius of the developing roller 102 plus the radius of the fur-brush supplying roller 104 to form an overlap, causing a nip depth to be in a range of about 100 um to 350 um.

Figure 7:
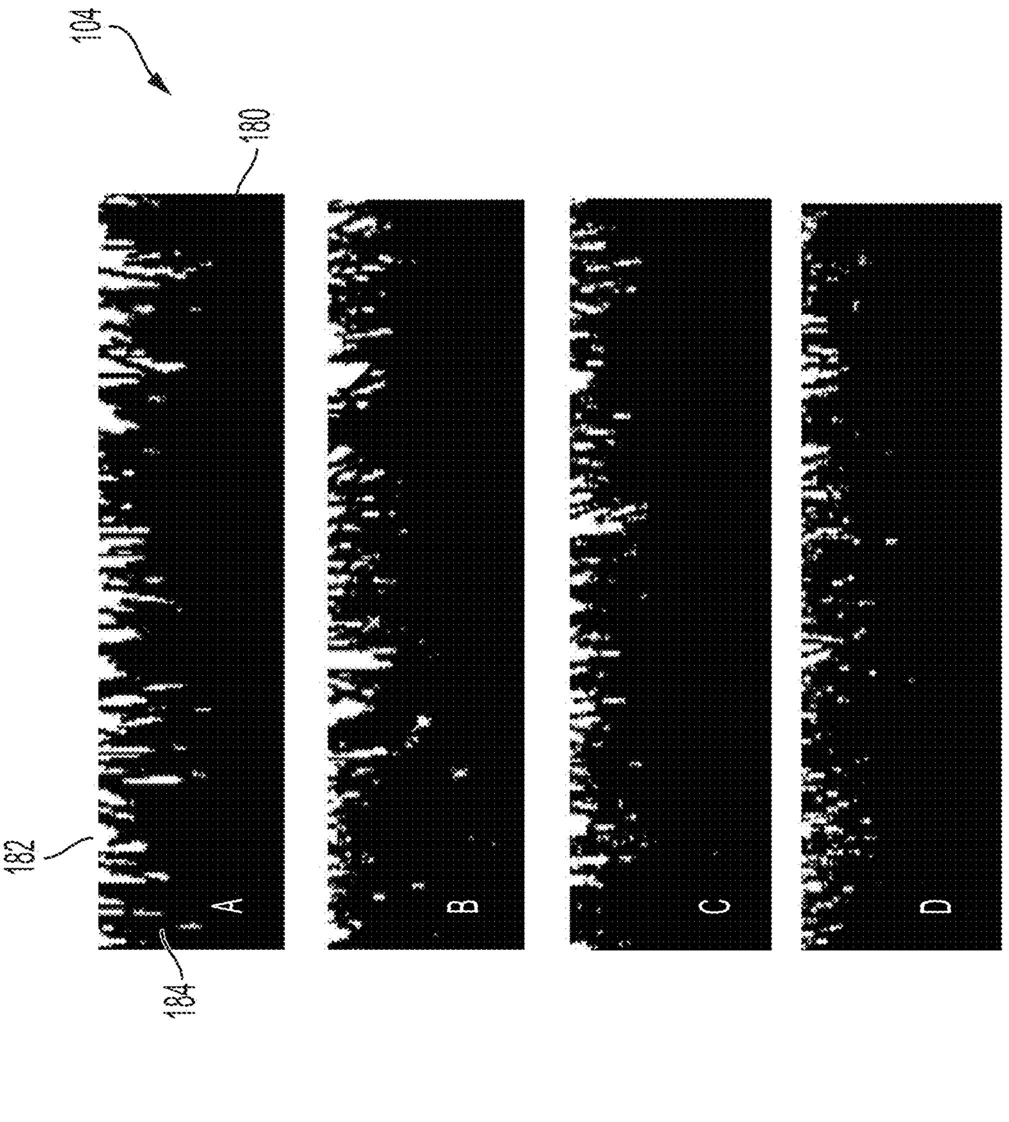
FIG. 7 illustrates images of fur-brush type supplying roller obtained from a measurement equipment, according to an example.

FIG. 7 illustrates images of fur-brush type supplying roller obtained from a measurement equipment, according to an example. As an example, a fur-brush type supplying roller 104 applied in a non-magnetic one developer component development system (as opposed to a two component developing method where a magnetic carrier and a developer, such as toner, may be used) may have a low coefficient of friction, low torque, and may reduce wear rate of the developing roller 102, which minimize toner stress. In some examples, the fur-brush type supplying roller 104 may use filament yarn, which may be made by spirally winding the fabric woven with piles on a shaft, or may be made by electrostatically planting yarn on a shaft with high voltage. As an example, the manufacturing process of the fur-brush type supplying roller 104 may include a process of cutting yarn, for example, conductive yarn, the process of planting the conductive yarn on the shaft coated with adhesive in the electrostatic facility, the process of curing, the process of polishing the fur-brush type supplying roller 104 to a desired size, and the process of cleaning. In some example, fur brushes, in form of bristles, of the fur-brush type supplying roller 104 may include, for example, Nylon 6/6; Nylon 12; polyester; acryl, which may be given electrical conductivity by a material such as carbon black. As an example, Nylon 12 which may have excellent toner chargeability and less sensitive to humidity may be used, but the disclosure is not limited to a specific material.

Referring to FIG. 7, a density of fur brushes 180 of the fur-brush type supplying roller 104 may be measured by measurement equipment or devices, for example, a digital micro-scope, such as DINO-LITE, AM3113T model, and applying image post processing through machine readable instructions, for example, an ImageJ program. The density of the fur brushes may be measured by the digital micro-scope of which magnification may be 50 diameter on a condition of edge-focusing and setting a grid line pitch to 50 mm. As an example, 5 square regions, which have an area of 50×50 $mm^2$ of edge point, of an image obtained from the digital micro-scope are extracted. The extracted image may be post processed by adjusting the RGB stack (8-bit), to distinguish an area of fur brush 184 (dark color) from an area of background 182 (white color), and applying a threshold to the area of fur brush vs. the background area to obtain a fur brush density value. As an example, the fur brush density may be in a range of about 83% up to about 100%. In some examples, fur brush density may be over 83% to about 100%. Referring to FIG. 7, example images of fur brushes and corresponding measured densities are illustrated:

Image A: 82% (Fail),
Image B: 84% (acceptable),
Image C: 90% (good),
Image D: 95% (excellent)

According to an example, in the image forming apparatus 1 using an electrophotographic system, the fur-brush type supplying roller 104 may reduce torque at a contact area between the developing roller 102 and the fur-brush type supplying roller 104, which for example may reduce toner stress. Therefore, the fur-brush type supplying roller 104 may be suitable for extending life-span of the developing cartridge 10 and reduce a defect in an image defect including a vertical streak which may be caused by toner stress. The fur-brush type supplying roller 104 is to control causation of an increase in thickness of toner layer that may occur due to inability of resetting residual toner formed on the developing roller 102, which may increase excessive toner consumption to not satisfy a desired toner yield life span. In some examples, the fur-brush type supplying roller 104 may control causation of defects in an image, such as side vertical dark band, positive ghost, or a defect that may be caused by a shape of a grinded cell of the developing roller 102. In some examples, a condition of the nip depth 152 between the developing roller 102 and the fur-brush type supplying roller 104 is controlled, because, for example, if the nip depth 152 is increased to improve ability of resetting residual toner, then a proper restoration of a compression of the fur brush 180 when the fur brush 180 is pressed by developing roller 102 may not occur.

The density of the fur-brush 180 of the fur-brush type supplying roller 104 may affect the image density. A higher fur density may lead to a better ability of supplying toner to the developing roller 104. As the fur density gets lower, there may be a tendency of causing an image defect, such as bad toner supply, and faded image by the fur-brush type supplying roller 104 rotation cycle. Some fur-brush type supplying rollers may have been applied in a non-magnetic developing system, however, the fur-brush type supplying rollers may have been difficult to be applied to developing cartridges which have a long-life span.

According to an example, at least one condition among conditions of the nip depth 152 between the fur-brush type supplying roller 104 and the developing roller 104, the groove depth 120 of the developing roller 104, and the density of the fur brush 180, may be set to reduce developer, for example, toner, stress, and the setting may further include setting at least one correlation, among correlations, between the nip depth 152, the groove depth 120 of the developing roller 104, and the density of the fur brush 180.

As an example, an image forming apparatus may include the cartridge 10 including a developing roller 102 to carry a developer, and a fur-brush type supplying roller 104 to form a nip with the developing roller 102 to supply the developer to the developing roller 102. The cartridge satisfying at least one condition among conditions of, a nip depth between the fur-brush type supplying roller 104 and the developing roller 102 being in a range of about 100 um to about 350 um, a groove depth 120 of a groove on a surface layer of the developing roller 102 being in a range of about 0.5 um to about 10 um, or a density of fur brush of the fur-brush type supplying roller 104 being to about 83% or higher. A percentage (%) of a ratio between a groove depth and the nip depth is in a range of about 0.5% to about 3.0%. At least one condition among conditions include a condition of a surface layer of the developing roller 102 includes a groove 120 formed on the surface layer, a depth of a nip 152 formed between the fur-brush type supplying roller 104 and the developing roller 102 is set according to a ratio between a depth of the groove 120 and the depth of the nip 152, and a density of fur brushes of the fur-brush type supplying roller 104 is set in relation to at least one depth among depths of the depth of the groove 120 or the depth of the nip 152.

As an example, a correlation between the groove depth 120 and the nip depth 152 may be is represented by groove depth 120/nip depth 152=about 0.5% to about 3.0%; and the density of the fur-brush 180 of the fur-brush type supplying roller 104 may be over 83% when, for example, an average density of the fur-brush 180 based on at least 5 measurement points obtained from a measurement equipment is analyzed. As an example, if such a correlation condition is satisfied, a longitudinal rise of toner density, toner yield, reduction in image defects, such as side stain, vertical streak, ghost, and image density fluctuation, may be improved which can achieve a long-life span of the developing cartridge 10 in the non-magnetic electrophotographic image forming apparatus 1.

Table 1 describes a $1^{st}$ set of experimental data of correlations among the conditions.

TABLE 1

| | DR Groove Depth | DR-SR Nip depth | DR Groove Depth/Nip depth | SR Fur-Brush Density | Vertical Streak | Side Image Stain | Ghost | Toner Supply Image Fade | Compres-sion Set | Toner Yield |
|---|---|---|---|---|---|---|---|---|---|---|
| Example 1 | 0.6 μm | 100 μm | 0.5% | 91% | ◎ | ○ | Δ | Δ | ◎ | ○ |
| Example 2 | 3 μm | 100 μm | 3.0% | 92% | ◎ | Δ | Δ | Δ | ◎ | ○ |
| Example 3 | 2 μm | 250 μm | 0.8% | 90% | ◎ | ○ | ○ | ○ | ○ | ◎ |
| Example 4 | 7 μm | 250 μm | 2.8% | 92% | ◎ | ○ | ○ | ○ | ○ | ◎ |
| Example 5 | 2 μm | 350 μm | 0.6% | 92% | ◎ | ◎ | ○ | ◎ | Δ | ◎ |
| Example 6 | 10 μm | 350 μm | 2.9% | 89% | ◎ | ○ | ○ | ◎ | Δ | ◎ |
| Comparative Example 1 | 0.7 μm | 90 μm | 0.8% | 90% | Δ | Δ | X | X | ◎ | X |
| Comparative Example 2 | 10 μm | 90 μm | 11.1% | 91% | ◎ | X | X | Δ | ◎ | X |
| Comparative Example 3 | 1 μm | 370 μm | 0.3% | 91% | ○ | ○ | ○ | ◎ | X | ○ |
| Comparative Example 4 | 11 μm | 350 μm | 3.1% | 89% | ◎ | X | ○ | ○ | Δ | ○ |
| Comparative Example 5 | 9 μm | 380 μm | 2.4% | 90% | ◎ | ○ | ○ | ○ | X | ○ |

Figure 8A:
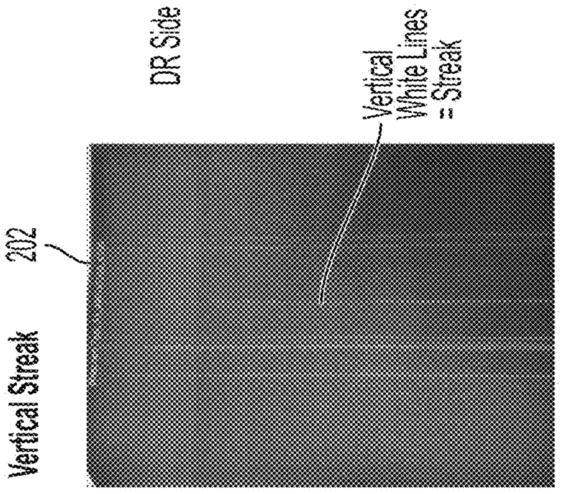
FIG. 8A-8E are images of example image defects as reference image defects.
Figure 8B:
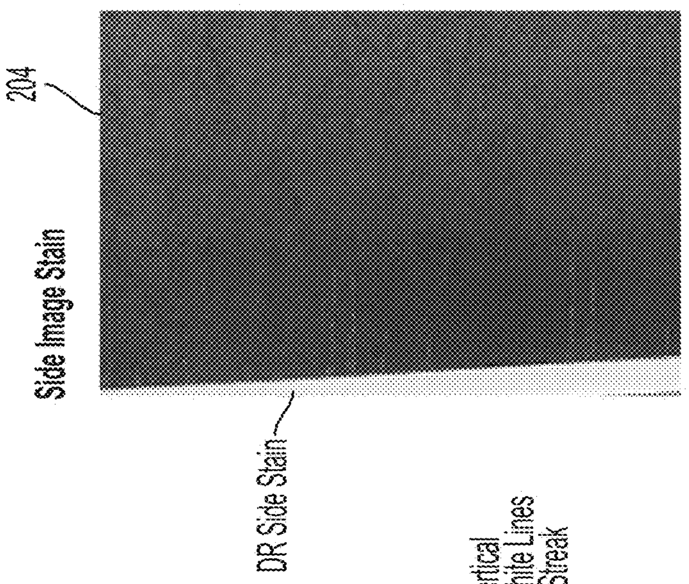
Figure 8C:
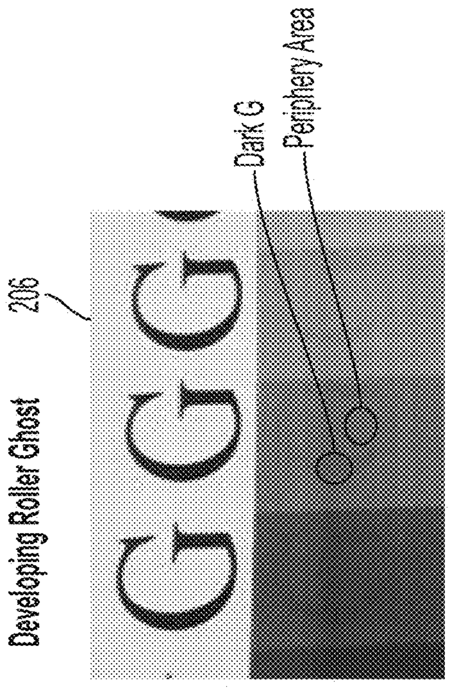
Figure 8D:
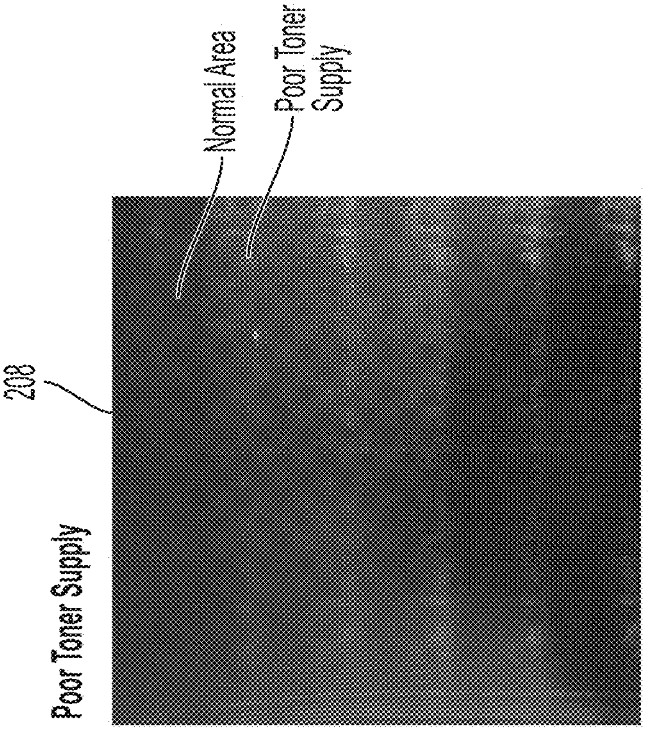
Figure 8E:
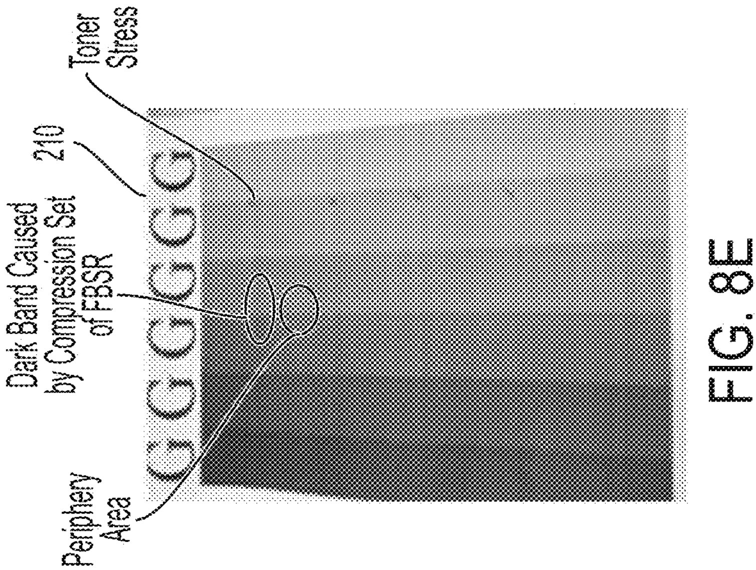

FIG. 8A-8E are images of example image defects as references. Referring to FIGS. 8A-8E, types of image defects indicated in the column headings of Tables 1 and 2 may include vertical streak (FIG. 8A, 202); side image stain (FIG. 8B, 204); ghost (FIG. 8C, 206); toner supply image fade (FIG. 8D, 208); FBSR Compression Set (C/S) (FIG. 8E, 210).

The following table symbols refer to: ◎—Excellent; ○—Good; Δ—Acceptable; and X—Bad.

Referring to FIG. 8A, Vertical Streak 202:

- ◎—Excellent—Vertical streak may not occur in an image printed with a defined solid pattern, and about 30% half-tone pattern.
- ○—Good—Vertical streak may not occur in an image printed with a defined solid pattern or may occur in form of 1 to 2 white lines in an image printed with about 30% half-tone pattern.
- Δ—Acceptable—Vertical streak may occur in form of a white line in an image printed with a defined solid pattern.
- X—Bad—Vertical streak may occur in form of over 2 white lines in an image printed with a defined solid pattern.

Referring to FIG. 8B, Side stain 204:

- ◎—Excellent—Side stain which shape may come from the groove depth 120 of the developing roller 102 may not occur in an image printed with a defined solid pattern.
- ○—Good—Side stain which shape may come from the groove depth 120 of the developing roller 102 may occur in less than 2 lines of which each length may be less than 5 mm in an image printed with a defined solid pattern.
- Δ—Acceptable—Side stain which shape may come from the groove depth 120 of the developing roller 102 may occur in in 2 to 4 lines of which each length may be less than 5 mm in an image printed with a defined solid pattern.

X—Bad—Side stain which shape may come from the groove depth 120 of the developing roller 102 may occur over 5 lines, of which a length of each line may be less than 5 mm, 3 lines may each have a length less than 10 mm, a line which may have a length over 10 mm, in an image printed with a defined solid pattern.

Referring to FIG. 8C, Developing Roller (DR) 102 Ghost 206:

- ◎—Excellent—Image concentration deviation between image ‘dark G’ and periphery image may be in a range of 0~0.01 in an image printed with a predefined ghost pattern.
- ○—Good—Image concentration deviation between image ‘dark G’ and periphery image may be in a range of 0.02~0.05 in an image printed with a predefined ghost pattern.
- Δ—Acceptable—Image concentration deviation between image ‘dark G’ and periphery image may be in a range of 0.06~0.09 in an image printed with a predefined ghost pattern.
- X—Bad—Image concentration deviation between image ‘dark G’ and periphery image may be over 0.1 in an image printed with a predefined ghost pattern.

Referring to FIG. 8D, Toner Supply causing image fading 208, which may be referred to as image concentration deviation between a normal image area and a poor toner supply area:

- ◎—Excellent—Poor toner supply may not occur in an image printed with a defined solid pattern.
- ○—Good—Image concentration deviation between a normal image area and a poor supply area may be less than about 0.05 in an image printed with a defined solid pattern.
- Δ—Acceptable—Image concentration deviation between a normal image area and a poor supply area may be in a range of about 0.05 to about 0.2 in an image printed with a defined solid pattern.
- X—Bad—Image concentration deviation between a normal image area and a poor supply area may be over about 0.2 in an image printed with a defined solid pattern.

Referring to FIG. 8E, Compression Set 210 of fur-brush supplying roller (FBSR) 104, which may be referred to as image concentration deviation between a dark band caused by compression set (C/S) of FBSR and periphery image, and may also cause toner stress as shown:

- ◎—Excellent—Compression set may not occur in an image printed with about a 30% half-tone pattern.
- ○—Good—Image concentration deviation between a dark band caused by C/S of FBSR and periphery image may be less than about 0.02 in an image printed with about a 30% half-tone pattern.
- Δ—Acceptable—Image concentration deviation between a dark band caused by C/S of FBSR and periphery image may be in a range of about 0.02 to about 0.04 in an image printed with an about 30% half-tone pattern.
- X—Bad—Image concentration deviation between a dark band caused by C/S of FBSR and periphery image may be over 0.04 in an image printed with an about 30% half-tone pattern.

Toner Yield: As an example, a test cartridge contained a developer, such as toner, in form of a toner cartridge, included the developing roller 102 and the fur-brush type supplying roller 104 arranged according to the conditions described in the present disclosure, which life-span may be expected to be about 100 Kpv (1000 (kilo) page volume, for example, 100 kpv=100,000 page volume (the test cartridge life measured as 100,000 pages output)).

Test environment: Preparation of the test toner cartridge after the high temperature and high humidity package cycle evaluation:

1 cycle: 23° C., 55% 5 min

Ramp up a temperature to 38° C./(humidity: 90%) in 55 minutes, maintain the condition for 30 hours.

Ramp up a temperature to 48° C./(humidity: 80%) in an hour, maintain the condition for 48 hours.

Ramp down a temperature to 38° C./(humidity: 90%) in an hour, maintain the condition for 33 hours.

Ramp down a temperature to 23° C./(humidity: 55%) in 2 hours, maintain the condition for 36 hours.

Test Procedures:

A. Measure initial weight of the test toner cartridge.

B. Yield test may be conducted with repeatedly printing a defined 5% ISO pattern to 500 pages without delay, rest 20 minutes, and measure weight of test toner cartridge until end of life-span.

B. Image concentration loss may occur at the end of life-span test, then continue to shake the test toner cartridge, which may be shaken 20 times downward, and conduct a test again, until a third image concentration loss occurs.

- ◎—Excellent—about 120% life-span in yield test
- ○—Good—110%~about 120% life-span in yield test
- Δ—Acceptable—about 100%~about 110% life-span in yield test
- X—Bad—about less than 100% life-span in the yield test Table 1: In examples 1 to 6, on conditions that the groove depth 120 of the developing roller 102 is within the range of about 0.5 μm~10 μm, nip depth 152 between the developing roller 104 and the fur-brush type supplying roller 104 is within about 100 μm to 350 μm, and the groove depth 120/nip depth 152 is in the range of about 0.5%~about 3.0%, and the density of the fur brush 180 is over 83%. In examples 1-6 of Table 1, it may be observed that image quality may be satisfied between excellent to acceptable up to 100 kpv without bad ghosting, bad toner supply image, bad compression set, bad toner yield, or bad image density fluctuations of vertical streak or side image stain.

Comparative Example 1: It may be observed that a nip depth 152 that is less than 100 μm may cause inferior ability of resetting residual toner on the surface of developing roller 102, which is represented as image defects such as ghost by the developing roller 102 rotation cycle, or bad toner supply image fade. And bad toner yield may be caused by longitudinal rise of toner density.

Comparative Example 2: It may be observed that a groove depth 120 that has a value closer to an upper range of 10 μm and the nip depth 152 that is 90 μm, which lower than a lower range of 100 μm, may cause inferior ability of resetting residual toner on the surface of the developing roller 102 and cause toner filming along the groove 110, which may cause image defects such as ghost by the developing roller 102 rotation cycle, a side image stain which shape comes from the groove depth 120, or bad toner supply image fade. And bad toner yield may be caused by longitudinal rise of toner density.

Comparative Example 3: It may be observed that a nip depth 152 that is over 350 μm may cause a compression set so that fur brush 180 pressed by developing roller 102 is not restored, which may cause an image defect such as a dark band by the fur-brush type supplying roller 104 rotation cycle.

Comparative Example 4: It may be observed that a groove depth 120 which is over 10 μm may cause toner filming along to the groove 110 even under a condition of a high nip depth 152 between the developing roller 102 and the fur-brush type supplying roller 104, which may cause image defects such as a side image stain which shape comes from the groove depth 120.

Comparative Example 5: It may be observed that a nip depth 152 that is 380 μm, which is over the upper range 350 μm, may cause a compression set so that fur brush 180 pressed by the developing roller 102 is not restored even under condition that a value of the groove depth 120/nip depth 152 is 2.4%, which may cause an image defect such as a dark band by the fur-brush type supplying roller 104 rotation cycle.

Table 2 describes a 2$^{nd}$ set of experimental data of correlations among the conditions.

TABLE 2

| | DR Groove Depth | DR-SR Nip depth | Groove Depth/Nip depth | SR Fur-Brush Density | Vertical Streak | Side Image Stain | Ghost | Toner Supply Image Fade | Compres-sion Set | Toner Yield |
|---|---|---|---|---|---|---|---|---|---|---|
| Example 7 | 0.6 μm | 100 μm | 0.6% | 83% | ◎ | ○ | Δ | Δ | ◎ | ○ |
| Example 8 | 3 μm | 100 μm | 3.0% | 95% | ◎ | Δ | Δ | ○ | ◎ | ○ |
| Example 9 | 2 μm | 350 μm | 0.6% | 84% | ◎ | ◎ | ○ | Δ | Δ | ◎ |
| Example 10 | 10 μm | 350 μm | 2.9% | 83% | ◎ | Δ | ○ | ○ | Δ | ◎ |
| Example 11 | 2 μm | 350 μm | 0.6% | 95% | ◎ | ◎ | ○ | ◎ | Δ | ○ |
| Example 12 | 10 μm | 350 μm | 2.9% | 95% | ◎ | Δ | ○ | ◎ | Δ | ○ |
| Comparative Example 6 | 0.6 μm | 100 μm | 0.6% | 81% | ○ | ○ | X | X | ◎ | ○ |
| Comparative Example 7 | 3 μm | 100 μm | 3.0% | 80% | ○ | ○ | X | X | ◎ | ○ |
| Comparative Example 8 | 2 μm | 350 μm | 0.6% | 81% | ○ | ○ | Δ | X | Δ | ◎ |
| Comparative Example 9 | 10 μm | 350 μm | 2.9% | 82% | ○ | Δ | Δ | X | Δ | ◎ |

Table 2. In example 1 to 6, on conditions that the groove depth 120 of the developing roller 102 is within the range of about 0.5~about 10 μm, the nip depth 152 between developing roller 102 and the fur-brush type supplying roller 104 is within about 100 μm to about 350 μm, and the correlation of the groove depth 120/nip depth 152 is in the range of about 0.5% to about 3.0%, and the density of the fur brush 180 is about 83% or higher. In examples 1 to 6 of Table 2, it may be observed that image quality may be satisfied up to 100 kpv without bad ghosting, bad toner supply, bad compression set, bad toner yield fail or bad image density fluctuations of vertical streak or side image stain.

Comparative Examples 6 and 7: It may be observed that a fur density of the fur brush 180 which is under the lower range of 83% may cause inferior ability of resetting residual toner on the surface of the developing roller 102 and inferior ability of supplying toner to the developing roller 102, which may cause image defects such as ghost by the developing roller 102 rotation cycle, and faded image.

Comparative Examples 8 and 9 represent image defects of ghosting and faded image. It may be observed that a fur density of the fur brush 180 which is under the lower range of 83% may cause inferior ability of supplying toner to the developing roller 102 even under a condition that values of a groove depth 120 and nip depth 152 are in respective ranges of about 0.5 μm to about 10 μm, and about 100 μm to about 35 μm, which may cause image defects such as ghosting and faded image.

According to an example, life-span of a toner cartridge implementing a non-magnetic, one developer component as a one-component developing system may be extended by reducing toner stress, through improving the ability of the fur-brush roller to supply toner without deterioration so that a fur-brush roller is not difficult to be applied to provide a long-life toner cartridge.

According to an example, a method and an image forming apparatus is to minimize toner stress that may occur in a developing device as a cartridge at the contact area between a developing roller and a supplying roller in form of a fur-brush supplying roller, which toner stress may lead to image defects such as vertical streak, and reduce the life span of the developing device.

The fur-brush type supplying roller 104 reduces image defects such as side stain, ghost by developing roller 102 rotation cycle, image density, poor toner supply, and compression set that may be caused by application of a fur brush supplying roller and may result in the fur-brush supplying roller being difficult to be applied to a long-life type developing cartridge. Therefore, according to the disclosure, the developing roller 102, the fur-brush type supplying roller 104, a relation of the groove depth 120 of the developing roller 102 and nip depth 152 between the fur-brush type supplying roller 104 and the developing roller 102, in a developing device for an electrophotographic image forming apparatus, and a method thereof, is to extend the life span of the developing device by minimizing toner stress.

As an example, image defects such as side stain whose shape may result from a groove of a developing roller, inferior ghosting by the developing roller, and longitudinal rise of toner density, may occur on a condition of too shallow of a nip depth 152 a developing roller and a fur-brush supplying roller. On the other hand, a scenario that a compression set resulting from a fur-brush supplying roller pressed by a developing roller may not be restored may occur on condition of too deep of a nip depth 152 between a developing roller 102 and a fur-brush supplying roller 104. According to the disclosure, toner stress may be reduced by at least one condition among conditions of, a nip depth between the fur-brush type supplying roller 104 and the developing roller 102 being set in a range of about 100 um to about 350 um, a groove depth of a groove on a surface layer 116 of the developing roller 102 being set in a range of about 0.5 um to about 10 um, and a density of fur brushes of the fur-brush type supplying roller 104 being set to about 83% or higher.

The words "a," "an" and "the" are intended to include plural forms of elements unless specifically referenced as a single element. The term "at least" preceding a listing of elements denotes any one or any combination of the elements in the listing. In other words, the expression "at least one of . . . " when preceding a list of elements, modifies the entire list of elements and does not modify the individual elements of the list.

While this disclosure has been shown and described with reference to examples thereof, it will be understood by one of ordinary skill in the art that various changes in form and details may be made therein without departing from the scope as defined by the claims.

The invention claimed is:

1. A cartridge to contain a developer, comprising:

a developing roller to carry the developer, a surface layer of the developing roller including a groove formed on the surface layer; and a fur-brush type supplying roller to form a nip region with the surface layer of the developing roller and to come into contact with the groove, to supply the developer to the developing roller, wherein a depth of the nip region of formed between the developing roller and the fur-brush type supplying roller is in a range of 100 μm to 350 μm.

2. The cartridge according to claim 1, wherein a depth of the groove is in a range of 0.5 μm to 10 μm.

3. The cartridge according to claim 1, wherein the depth of the groove is less than 5 μm.

4. The cartridge according to claim 1, wherein a density of fur brushes of the fur-brush type supplying roller is in a range of 83% to 100%.

5. The cartridge according to claim 1, wherein an average depth of the groove over a length is in a range of 0.5 μm to 10 μm.

6. The cartridge according to claim 1, wherein a percentage (%) of a ratio between a depth of the groove and a depth of the nip region formed between the developing roller and the fur-brush type supplying roller is from in a range of 0.5% to 3.0%.

7. The cartridge according to claim 1, wherein at least one condition among conditions includes a condition of a depth of the groove is in a range of 0.5 μm to 10 μm; a depth of the nip region of the nip formed between the developing roller and the fur-brush type supplying roller is in a range of 100 μm to 350 μm; and a density of fur brushes of the fur-brush type supplying roller is in a range of 83% to 100%.

8. A cartridge to contain a developer, comprising:

a developing roller to carry a developer, and a fur-brush type supplying roller to form a nip region with the developing roller to supply the developer to the developing roller, wherein a surface layer of the developing roller includes a groove formed on the surface layer, and a depth of the nip region formed between the fur-brush type supplying roller and the developing roller is set in a range of 100 um to 350 um according to a ratio between a depth of the groove and the depth of the nip region.

9. The cartridge according to claim 8, wherein, the depth of the groove on a surface layer of the developing roller is in a range of 0.5 μm to 10 μm, and a density of fur brushes of the fur-brush type supplying roller is set to be in a range of 83% to 100%.

10. The cartridge according to claim 9, wherein a percentage (%) of a ratio between the groove depth and the depth of the nip region is in a range of 0.5% to 3.0%.

11. The cartridge according to claim 8, wherein the depth of the groove is in a range of 0.5 μm to 10 μm.

12. The cartridge according to claim 11, wherein the depth of the groove is less than 5 μm.

13. The cartridge according to claim 8, wherein the depth of the nip region formed between the developing roller and the fur-brush type supplying roller is in a range of 100 μm to 350 μm.

14. An image forming apparatus, comprising:

a cartridge including, a developing roller to carry a developer, and a fur-brush type supplying roller to form a nip region with the developing roller to supply the developer to the developing roller, wherein a surface layer of the developing roller includes a groove formed on the surface layer, and a depth of the nip region formed between the fur-brush type supplying roller and the developing roller is set in a range of 100 μm to 350 μm according to a ratio between a depth of the groove and the depth of the nip region, where a percentage (%) of a ratio between the groove depth and the depth of the nip region is in a range of 0.5% to 3.0%.

* * * * *